(12) United States Patent
Yamamoto et al.

(10) Patent No.: US 11,316,846 B2
(45) Date of Patent: Apr. 26, 2022

(54) SECURITY UPDATE PROCESSING

(71) Applicant: NCR Corporation, Duluth, GA (US)

(72) Inventors: Isamu Leonard Yamamoto, Belmont, CA (US); Joel Smith, West Hills, CA (US); Eric K. J. Wang, Sunnyvale, CA (US)

(73) Assignee: NCR Corporation, Atlanta, GA (US)

( * ) Notice: Subject to any disclaimer, the term of this patent is extended or adjusted under 35 U.S.C. 154(b) by 357 days.

(21) Appl. No.: 15/691,094

(22) Filed: Aug. 30, 2017

(65) Prior Publication Data
US 2019/0068581 A1    Feb. 28, 2019

(51) Int. Cl.
| | | |
|---|---|---|
| *H04L 9/30* | (2006.01) | |
| *H04L 29/06* | (2006.01) | |
| *H04L 9/32* | (2006.01) | |
| *H04L 9/08* | (2006.01) | |
| *G06F 21/57* | (2013.01) | |
| *H04L 67/00* | (2022.01) | |
| *H04L 9/06* | (2006.01) | |

(52) U.S. Cl.
CPC .......... *H04L 63/0823* (2013.01); *G06F 21/57* (2013.01); *H04L 9/0643* (2013.01); *H04L 9/0891* (2013.01); *H04L 9/3226* (2013.01); *H04L 9/3242* (2013.01); *H04L 9/3268* (2013.01); *H04L 63/083* (2013.01); *H04L 63/10* (2013.01); *H04L 67/34* (2013.01); *G06F 2221/2115* (2013.01)

(58) Field of Classification Search
CPC ......... H04L 63/10; H04L 9/32; H04L 9/0891; G06F 21/57
See application file for complete search history.

(56) References Cited

U.S. PATENT DOCUMENTS

| | | | | |
|---|---|---|---|---|
| 6,816,900 | B1 * | 11/2004 | Vogel | H04L 9/3236 709/203 |
| 9,288,064 | B2 * | 3/2016 | Xiao | H04L 9/3265 |
| 10,298,404 | B1 * | 5/2019 | Behm | H04L 9/3263 |
| 10,454,689 | B1 * | 10/2019 | Sharifi Mehr | H04L 63/166 |
| 2004/0054889 | A1 * | 3/2004 | Pitsos | H04L 9/3263 713/156 |
| 2013/0061281 | A1 * | 3/2013 | Pao | G06F 21/44 726/1 |
| 2016/0315777 | A1 * | 10/2016 | Lloyd | H04L 63/0823 |
| 2017/0279619 | A1 * | 9/2017 | Yang | H04L 9/006 |

* cited by examiner

*Primary Examiner* — Wasika Nipa
(74) *Attorney, Agent, or Firm* — Schwegman, Lundberg & Woessner (57) ABSTRACT

A device is configured for dynamically obtaining updated hash values for certificate processing of endpoints from a dedicated and single server. The server's certificate is signed by a certificate authority that is the sole and root authority for the certificate processing on the device. When endpoints are connected to the device, the hash values are compared against computed hash values for the endpoints' certificates. Connections are deemed secure for the device when the computed hash values match the hash values provided by the server.

12 Claims, 5 Drawing Sheets

SECURITY UPDATE PROCESSING

BACKGROUND

A variety of security mechanisms are built into existing clients, their web browsers, and network-based services to ensure that when a user accesses a service, the user is actually accessing that service and not a spoofed service or not accessing a legitimate service with an eavesdropper situated in between the user and the service (referred to as "Man-In-The Middle (MITM)").

A popular security mechanism is the use of digital certificates and digital signatures. A requesting service (site) provides a signed certificate at the start of a transaction to a browser of the user during an initial handshake between the user's device (client) and the server that provides the user's desired service. The client does not inherently trust the received certificate; rather, the certificate is trusted because it is signed by a chain of other certificates that ultimately ends at a self-signed root certificate from a Certificate Authority (CA) that is pre-trusted by the Operating System (OS) of the client. The certificates are chained together with each certificate asserting (vouching) for the authority (validity) of a certificate below it.

Each certificate in the chain is validated by the client by performing a hash against some fields in that certificate to arrive at a hash value (referred to as a "PIN"). The client compares the PIN against an expected PIN that the client maintains for the certificate. When a computed PIN against a certificate does not match an expected PIN for the certificate, the certificate may be invalid or may require the client to obtain an updated PIN from a CA.

This processes of obtaining updating PINs is expensive and time consuming. Moreover, if the CA is compromised, the client is exposed to MITM attacks when attempting to interact with the network-based service. It is difficult and expensive to maintain multiple certificates and PINs for a single site with each certificate having different validation periods of time.

As a result, in this situation, the client is blocked due to a mismatched PIN value when it is not possible to update the PIN value, resulting in a Denial of Service (DOS) error from the browser indicating that the user is unable to connect to the site having the desired user service.

SUMMARY

In various embodiments, methods and a system for security update processing are presented.

According to an embodiment, a method for security update processing is presented. More particularly, an update request is received from a client that requests an updated hash value for a certificate associated with an endpoint that the client is attempting to connect to over a network. Next, the updated hash value is provided to the client for independent certificate verification processing by the client against the certificate.

DETAILED DESCRIPTION

Figure 1A:
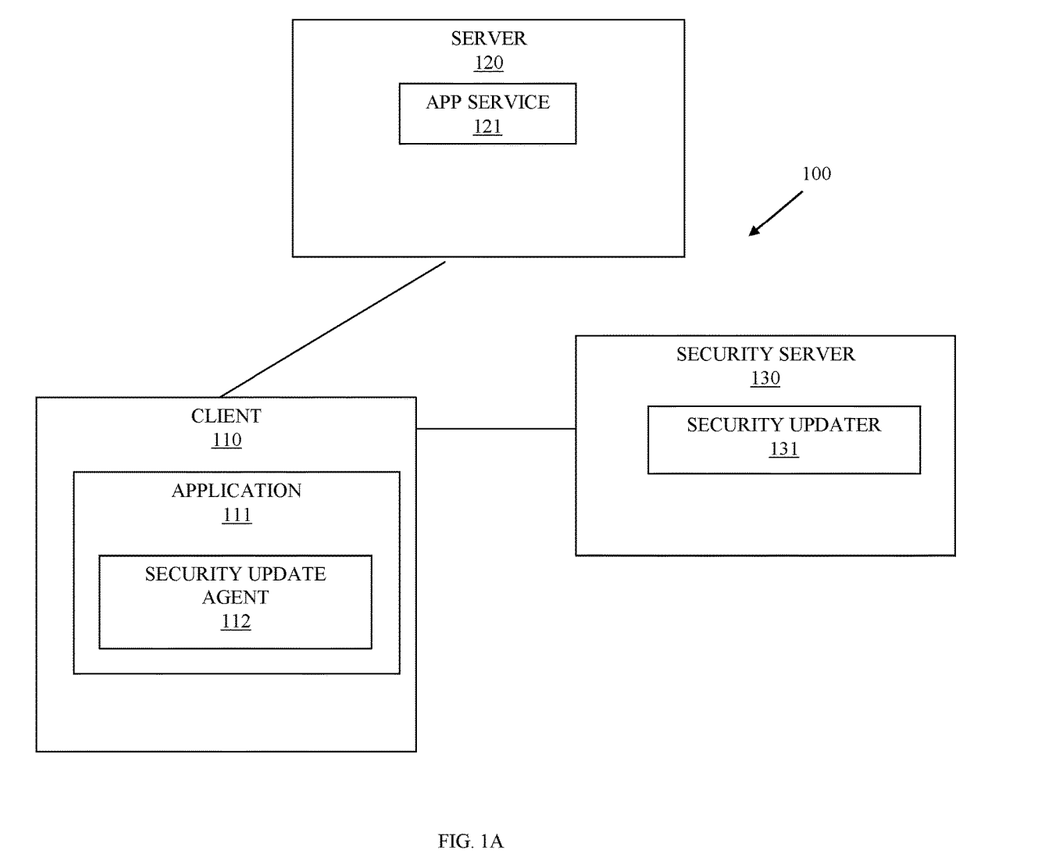
FIG. 1A is a diagram of a system for security update processing, according to an example embodiment.

FIG. 1A is a diagram of a system 100 for security update processing, according to an example embodiment. The various components are illustrated and the arrangement of the components is presented for purposes of illustration only. It is to be noted that other arrangements with more or less components are possible without departing from the security update processing teachings presented herein and below.

The techniques, methods, and system presented herein and below for security update processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

As used herein, the phrases and terms "hash value," "hash," "PIN," and "PIN value" may be used synonymously and interchangeably.

The system 100 includes a client 110 having an application 111 and a security update agent 112, a server 120 having an app service 121, and a security server 130 having a security updater 131. The interaction and processing of these components will now be discussed with reference to method presented in the FIG. 1B.

Figure 1B:
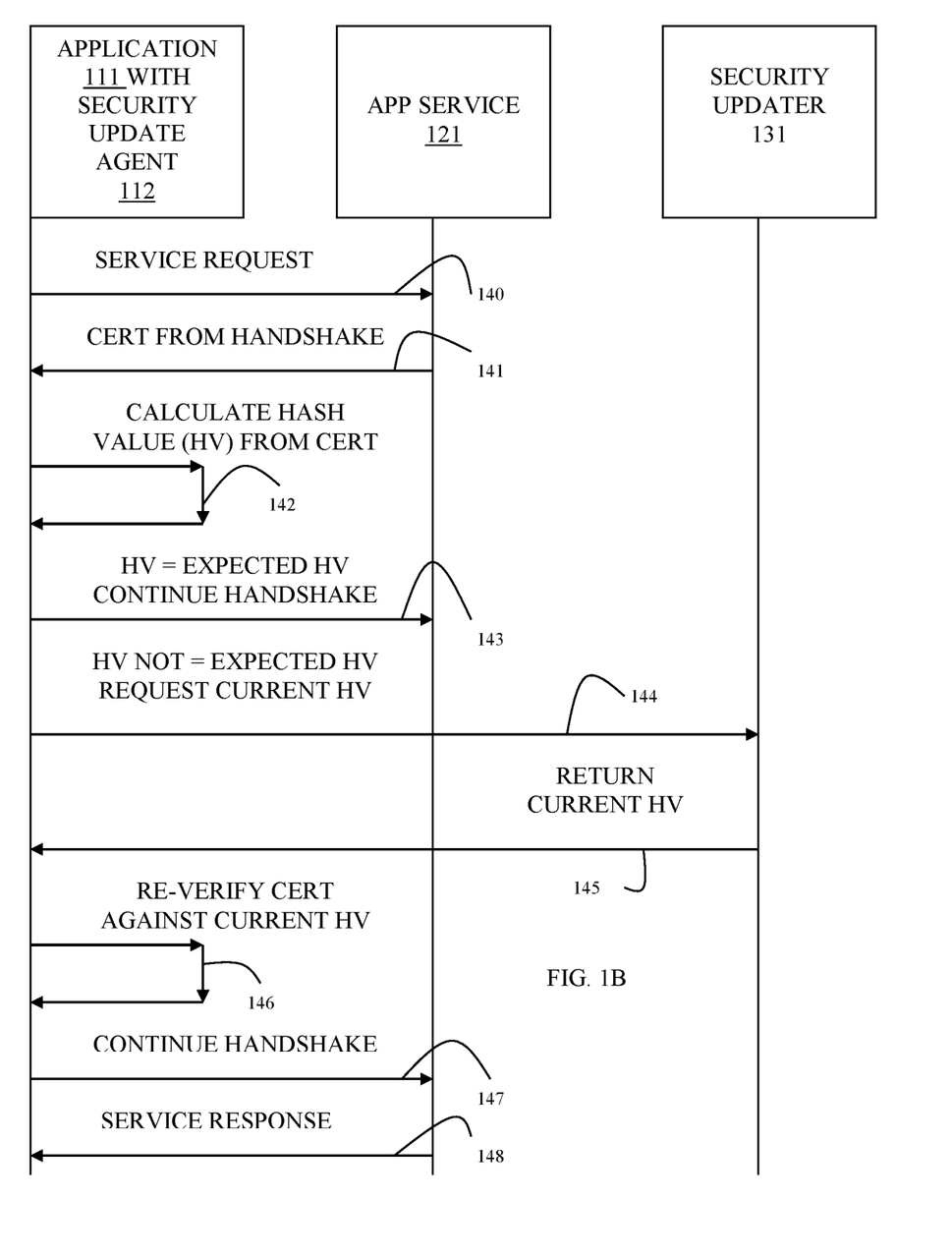
FIG. 1B is a diagram of a method of operating the system of FIG. 1A, according to an example embodiment.

At 140, the application 111 with the security update agent 112 makes a service request of the server 120 having the app service 121. The app service 121 returns a signed certificate during an initial communication handshake between the client 110 and the server 120, at 141.

At 142, the client 110 calculates a hash value from the signed certificate. The hashing algorithm and the component portions of the certificate that the client 110 processes to compute the hash value are preconfigured within the client 110 (such as within the OS of the client 110 and/or web browser application of the client 110).

After 142, two different processing paths are taken based on the computed hash value for the server 120 certificate returned from the initial communication handshake at 141.

In a first processing scenario 143, the client determines that the hash value is equal to an expected hash value that is maintained by the client 110 (hash values for certificates are maintained securely (encrypted storage/memory) on the client 110); so, the communication session between the client 110 and the server 120 is permitted to continue, indicating to the client 110 that the server 120 having the app service 121 can be trusted and does not appear to present any security concerns for the client 110 by the client 110 interacting with the app service 121 through the server 120.

In an alternative processing scenario following 141, at 144, the client 110 determines that the computed hash value does not equal the expected hash value; in response to this situation, the security update agent 112 is invoked by the client 110 for establishing a secure connection to the security updater 131 for purposes of obtaining an updated hash value for the certificate of the server 120 from the update security server 130.

The security update agent 112 is preconfigured with a certificate for the update security server 130 and any connection between the client and the server 130 is configured to only trust the root CA of the server 130 (as discussed below). The certificate is meant to remain relatively static. The client 110 receives the certificate when contacting the security updater 131 and verifies that the certificate is signed by the root CA. If the signature is invalid (not signed by the root CA), the connection between the client 110 and the server 130 is terminated and this also provides an indication that the server is not the server 130 or that the server 130 has been compromised in some manner.

In an embodiment, the security updater 131 provides updated PIN values (hash values) for all endpoint servers (mobile applications, web domains, etc.) accessible to the client 100, such that the security updater 131 is not just providing an updated PIN value (updated hash value) for just the web domain of the app service 121 at the server 120. In an embodiment, the application 111 is bundled and installed on the client 110 with all known PIN values for endpoint servers that the application 111 is configured to access and bundled with the certificate for the update server 130 signed by the CA.

In an embodiment, the security updater 131 provides updated PIN values for a single domain that is associated with multiple certificates and multiple corresponding PIN values. In an embodiment, the updater 131 is configured to designate a first PIN value for a single domain as an active PIN value and stage a second PIN value for the single domain. This permits the update server 130 to be updated ahead of an endpoint server (e.g., server 120, etc.) so that the PIN value and corresponding certificate for the endpoint server do not have to be automatically updated together.

In an embodiment, the security update server 130 utilizes its own private Certificate Authority (CA) to sign its certificate that is maintained by the client 110.

In an embodiment, when the request is made by the client 110 for an updated hash value, the security updater 131 returns a list of all current PIN values for all endpoints of the client 110, with the list including the needed updated hash value for the app service 121 within the list.

In an embodiment, the client 110 caches the returned list of PIN values with no preset expiration date for those PIN values on the client 110.

In an embodiment, the connection details between the client 110 and the server 130 is customized so that the client 110 only trusts and recognizes the CA that signed the certificate associated with the server 130 as the client's only trusted CA. This eliminates the possibility of the client 110 trusting a potentially fraudulent issued certificate associated with the server 130.

At 145, the security updater 131 returns an updated PIN value (updated hash value) that is being maintained for a valid certificate of the server 120 (app service 121).

At 146, the security update agent 112 uses the certificate obtained for the server 120, at 141, to recalculate a computed hash value for the certificate of the server 120 and compares that computed hash value against the updated hash value returned from the server 130, at 145.

Assuming, the newly computed hash value is equal to the updated hash value provided by the server 130, the client 110 permits a session between the client 110 and the server 120 to continue at 147. This results in a valid connection and session response from the app service 121 at 148.

If the updated PIN value for the app service 121 is unable to be obtained from the server 130 or if the updated PIN value still does not match the computed PIN value for the certificate of the server 120, the security updater 112 and the application 111 can be configured to:

(a) for connections to primary endpoints, the client 110 is configured to assume the network connection established at 141 is insecure and the client refuses the continued connection with the server 120; and (b) for connections to web resources (made by a primary endpoint for access to the web resources—secondary endpoint), such as features provided by an Online Banking or third-party vendor through single-sign on (SSO); the client 110 can be configured to verify the PIN value if one exists or allow the connection with, perhaps, a warning message to the user-operator of the client 110. (This is potentially a scenario where the app service 121 during a valid and authenticated session with the client 110 (the cert of the app server 120 matches an expected PIN value) accesses a resource on a different server from server 120 during its normal operation, which can change on a regular basis and for which all known PIN values cannot be reasonably predetermined.)

It is to be noted that during normal operation of the application 111 on the client 110, the security updater 112 is only activated when a computed PIN value for an endpoint (such as server 120) does not match the preconfigured and expected PIN value for the server 120. If PIN values do not match, the security updater 112 contacts the update server 130 and the security updater 131 for a current list of all known PIN values maintained by the server 130. This ensures that normal security processing with respect to endpoint certificate processing are handled in a normal manner by the client 110 and only changed when the client 110 attempts to update a PIN value and during such update all PIN values for known endpoints maintained by the server 130 are returned to the client 110.

In an embodiment, the pinning (PIN value processing) discussed above is configurable by the owner/distributor of the application 111 providing modes for being turned off, only reporting pinning, and blocking.

In an embodiment, the signed certificate of the update server 130 can be renewed by the client 110 at any time. Moreover, the client 110 processes verification on the certificate of the update server 130 in a conventional manner but uses the CA of the update server 130 as the client's sole (only) trusted CA (root authority).

In an embodiment, each time the application 111 is initiated within the OS, the preconfigured PIN values for the endpoints of the application 111 are retrieved in cache of the client 110.

In an embodiment, any pinning failures are reported by the security update agent 112 to a log server.

In an embodiment, a user interface with the application 111 permits pinning failures to be provided as messages to the user along with instructions on how the user can use the security update agent 112 to manually refresh the list of currently valid PIN values.

In an embodiment, the PIN values are incapable of being modified on the client 110 except through the security update agent 112 and the connection between the security update agent 112 and the update server 131 is custom encrypted and secure with the storage of the PIN values in secure memory of the client 110.

In an embodiment, the certificate of the update server 130 and the designation as the CA that signed that certificate is incapable of being edited on the client 110.

In an embodiment, the certificate of the update server 130 does not expire on the client 110.

In an embodiment, the device 110 is one of: a wearable processing device, a tablet, a phone, a desktop computer, a laptop computer, an appliance that is part of the Internet-of-Things (IoTs), a computer-based device integrated into a transportation vehicle.

In an embodiment, the application 111 is a financial institution app for a financial service (such as app service 121) of the user.

In an embodiment, the server 130 is one of several servers that cooperate together as a cloud processing environment.

These embodiments and other embodiments are now discussed with reference to the FIGS. 2-4.

Figure 2:
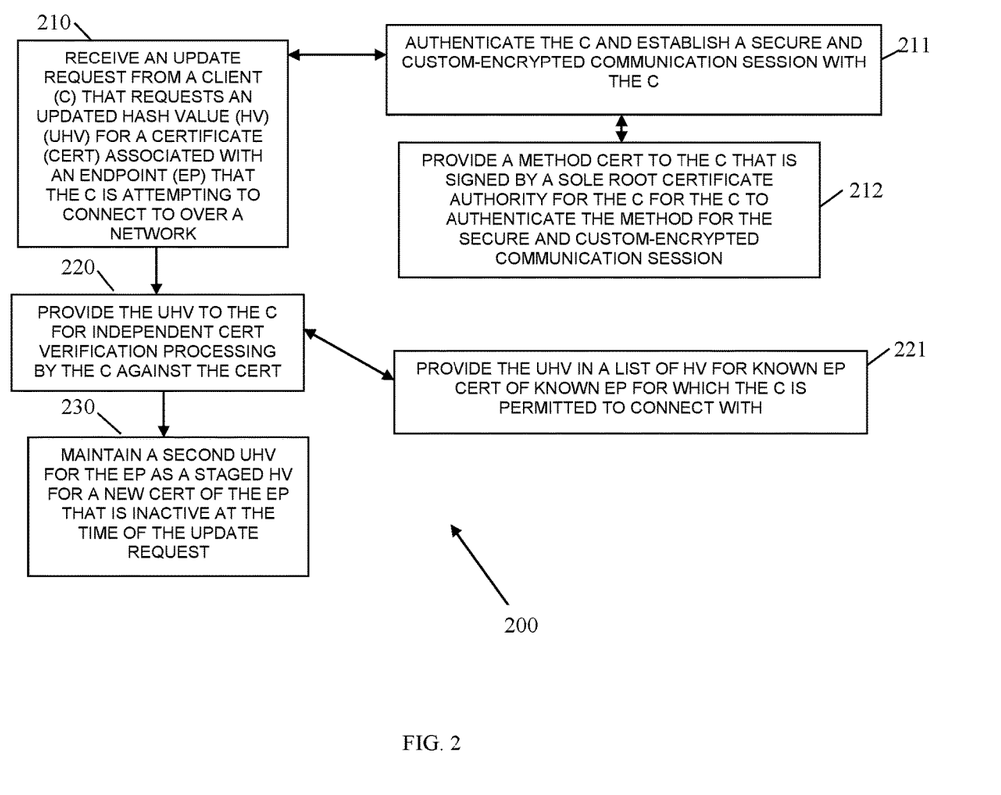
FIG. 2 is a diagram of a method for security update processing, according to an example embodiment.

FIG. 2 is a diagram of a method 200 for security update processing, according to an example embodiment. The software module(s) that implements the method 200 is referred to as a "pinning updater." The pinning updater is implemented as executable instructions programmed and residing within memory and/or a non-transitory computer-readable (processor-readable) storage medium and executed by one or more processors of a device. The processor(s) of the device that executes the pinning updater are specifically configured and programmed to process the pinning updater. The pinning updater has access to one or more networks during its processing. The networks can be wired, wireless, or a combination of wired and wireless.

In an embodiment, the pinning updater is the security updater 131 of the FIG. 1.

In an embodiment, the device that executes the pinning updater is the server 110.

In an embodiment, the device that executes the pinning updater is a plurality of servers logically organized as a cloud processing environment.

At 210, the pinning updater receives an update request from a client that requests an updated hash value (new PIN or PIN value) for a certificate associated with an endpoint that the client is attempting to connect to over a network connection.

According to an embodiment, at 211, the pinning updater authenticates the client and the update request and establishes a secure and custom-encrypted communication session with the client for purposes of providing the updated hash value to the client.

In an embodiment of 211 and at 212, the pinning updater provides a method cert (pinning updater cert) to the client that is signed by a sole root certificate authority (CA) for the client for purposes of permitting the client to authenticated the pinning updater (method 200) for the secure and custom-encrypted communication session.

At 220, the pinning updater provides the updated hash value to the client for independent certification verification processing by the client against or on the endpoint certificate.

According to an embodiment, at 221, the pinning updater provides the updated hash value in a list of hash values for all known endpoint certificates of known endpoints for which the client is permitted to connect with.

In an embodiment, at 230, the pinning updater maintains a second updated hash value for the endpoint as a staged hash value for a new (unreleased) certificate of the endpoint that is currently inactive at the time of the update request. This permits the pinning updater to be prepared when the endpoint releases the new certificate and can provide the staged hash value without having the new certificate.

Figure 3:
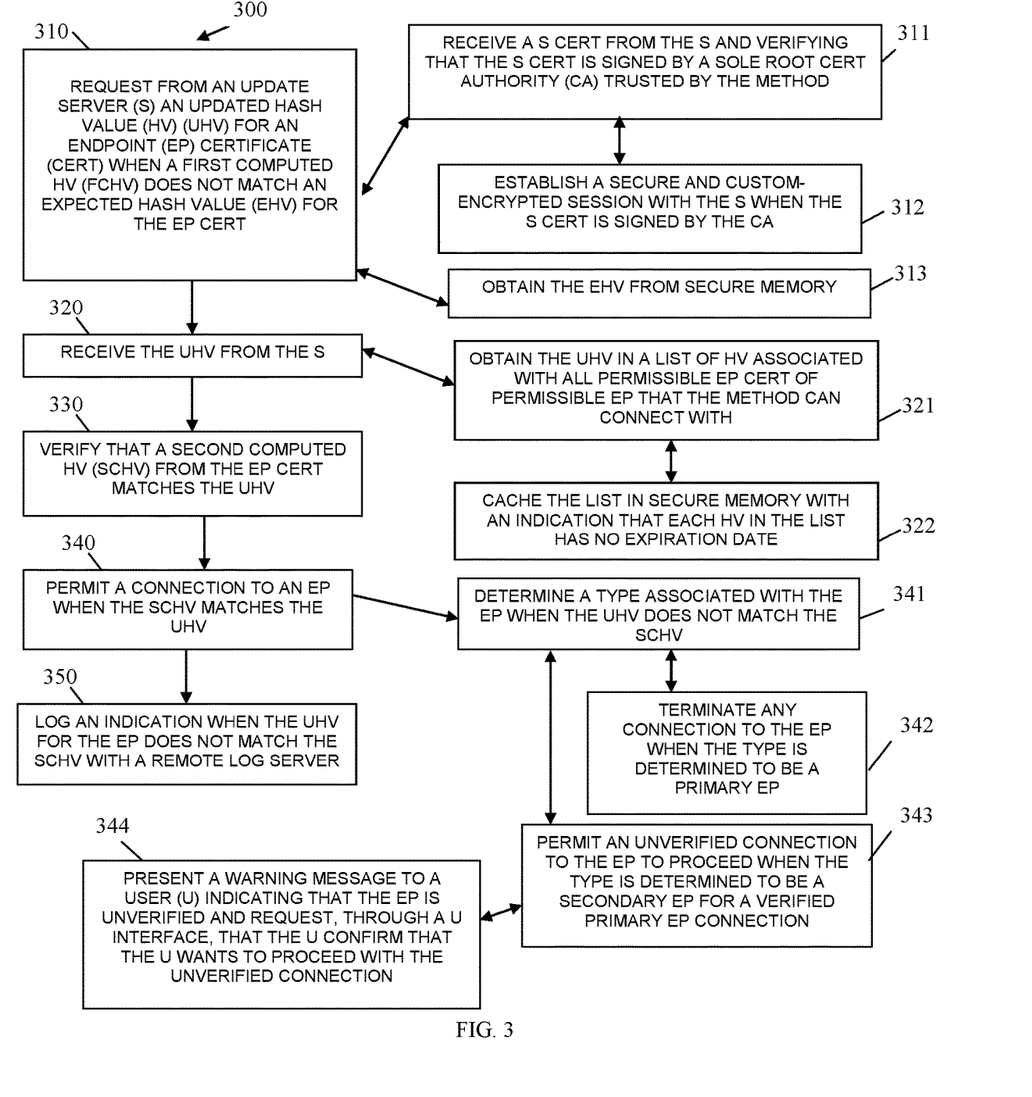
FIG. 3 is a diagram of another method for security update processing, according to an example embodiment.

FIG. 3 is a diagram of another method for security update processing, according to an example embodiment. The software module(s) that implement the method 300 is referred to herein as a "pinning agent." The pinning agent is implemented as executable instructions and programmed within memory and/or a non-transitory computer-readable (processor-readable) storage medium that executes on one or more processors of a device. The processors of the device are specifically configured to execute the pinning agent. The pinning agent has access one or more networks; the networks can be wired, wireless, or a combination of wired and wireless.

In an embodiment, the pinning agent is all of or some combination of the application 111 and the security update agent 112.

In an embodiment, the device that executes the pinning agent is the client 110.

In an embodiment, the device that executes the pinning agent is one of: a wearable processing device, a tablet, a phone, a desktop computer, a laptop computer, an appliance that is part of the Internet-of-Things (IoTs), a computer-based device integrated into a transportation vehicle.

The pinning agent interacts with the pinning updater described above as the method 200 of the FIG. 2.

At 310, the pinning agent requests, from an update server (such as server 130 and/or the method 200), an updated hash value for an endpoint certificate when a first computed hash value does not match an expected hash value for the endpoint certificate. That is, normal pinning is performed by the client device that executes the pinning agent until a computed hash value fails to match an expected hash value for a certificate.

In an embodiment, at 311, the pinning agent receives a signed certificate from the update server that is signed by a sole root CA trusted by the pinning agent (method 300).

In an embodiment of 311 and at 312, the pinning agent establishes a secure and custom-encrypted session with the update server when the signed certificate for the update server is signed by the CA.

In an embodiment, at 313, the pinning agent obtains the expected hash value from secure memory of the client that executes the pinning agent.

At 320, the pinning agent receives the updated hash value (new PIN) from the update server.

According to an embodiment, at 321, the pinning agent obtains the updated hash value in a list of hash values associated with all permissible certificates of permissible endpoints that the pinning agent (method 300) can connect with.

In an embodiment of 321 and at 322, the pinning agent caches the list in secure memory of the client that executes the pinning agent along with an indication for each hash value that there is no expiration date.

At 330, the pinning agent verifies that a second computed hash value from the endpoint certificate matches the newly-acquired updated hash value (dynamically obtained from the update server at 320).

At 340, the pinning agent permits a connection to an endpoint that provided the endpoint certificate when the second computed hash value matches the updated hash value.

In an embodiment, at 341, the pinning agent determines a type associated with the endpoint when the updated hash value still does not match or equal the second computed hash value.

In an embodiment of 341 and at 342, the pinning agent terminates any connection between the client (device executing the pinning agent) and the endpoint when the type is determined to be a primary endpoint (discussed above with the description of the FIGS. 1A-1B.

In an embodiment of 341 and at 343, the pinning agent permits an unverified connection to the endpoint to proceed when the type is determined to be a secondary endpoint for a verified primary endpoint connection. That is, the client may have validated the security for successfully connecting to a trusted endpoint and during that connection the trusted endpoint attempts to access a different resource over a different connection; here, the pinning agent can be configured to assume that since the existing connection to the trusted endpoint is authentic any resource accessed thereafter over a different connection can be assumed to be authentic. This can also occur with SSO third-party services. It is to be noted that this in one embodiment of the pinning agent as a different embodiment may still deny the connection to the secondary endpoint.

In an embodiment of 343 and at 344, the pinning agent presents a warning message to a user (operating the client) that indicates the endpoint is unverified and that requests the user confirm that the user wants to proceed with the unverified connection before the unverified connection between the client and the endpoint is allowed to continue.

Figure 4:
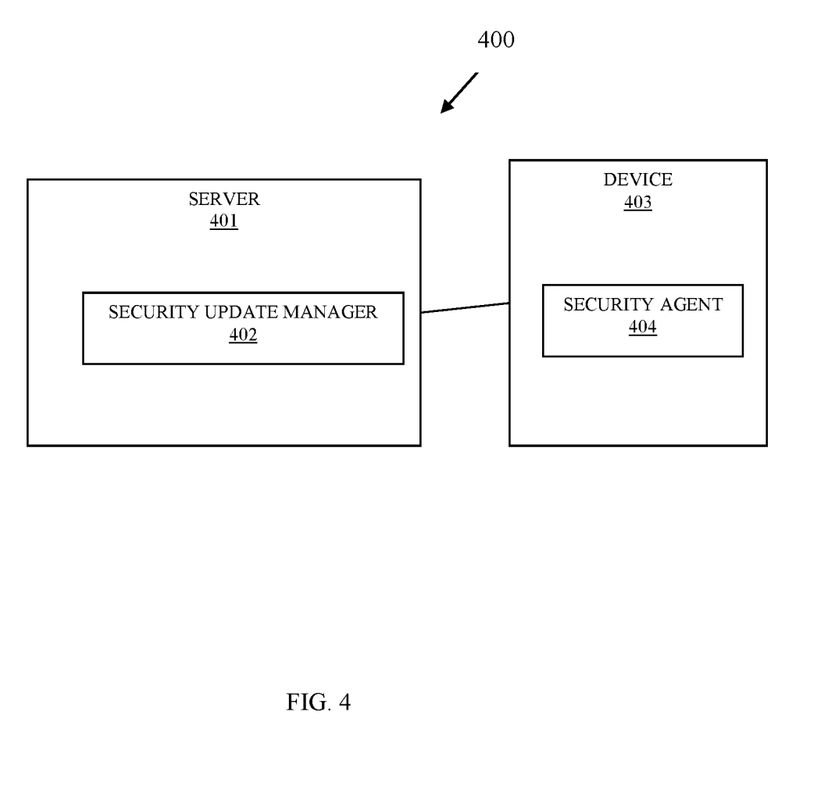
FIG. 4 is a diagram of another system for security update processing, according to an example embodiment.

FIG. 4 is a diagram of another system 400 for security update processing, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programed to perform the processing discussed above with the FIGS. 1-3.

The system 400 includes a server 401 having a security update manager 402 and a device 403 having a security agent 404.

In an embodiment, the server is the server 130.

In an embodiment, the server is a part of a cloud processing environment.

In an embodiment, the device 403 is the device 120.

In an embodiment, the device 403 is one of: a wearable processing device, a tablet, a phone, a desktop computer, an applicant that is part of the IoTs, and a computer-enabled device integrated into a transportation vehicle.

In an embodiment, the security update manager 402 is all of or some combination of: the security updater 131 and/or the method 200.

In an embodiment, the security agent 404 is all of or some combination of: the security update agent 112 and/or the method 300.

The security agent 404 executes on the device 403 and is configured to: i) execute on the device 403, ii) connect to the server 401 when a hash value for an endpoint certificate does not match a computed first hash value, iii) obtain an updated hash value from the security update manager 402, and iv) verify that the updated hash value matches a computed second hash value for the endpoint certificate before permitting the device 403 to connect to an endpoint.

In an embodiment, the security agent 404 performs some or all of the processing discussed above for the application 111, security update agent 112, and/or the method 300.

In an embodiment, the security agent 404 is further configured to: v) recognize a certificate authority that has signed a server certificate for the server 401 as a sole root certificate authority of the device 403.

The security update manager 402 executes on the server 401 and is configured to: i) execute on the server 401 and ii) establish a secure and custom encrypted session with the security agent 404 for providing the updated hash value.

In an embodiment, the security update manager 402 performs some or all of the processing discussed above for the security updater 131 and/or the method 200.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, on a server, an update request from a client that requests an updated hash value for a certificate associated with an endpoint that the client is attempting to connect to over a network, wherein receiving further includes authenticating the client and establishing a secure and custom-encrypted communication session with the client, wherein authenticating further includes providing a second certificate to the client that is signed by a private certificate authority of a sole and only root certificate authority of the client for the client to authenticate for the secure and custom-encrypted communication session;
providing, by the server, the updated hash value to the client for independent certificate verification processing by the client against the certificate, wherein providing further includes providing, by the server, a list comprising additional updated hash values to the client for all permissible endpoints of the client based on receiving the update request from the client for the endpoint, and wherein the list also comprises the updated hash value;
servicing, by the server, the client as the sole and only root certificate authority from which all updated hash values for all endpoints are obtained by the client;
signing, by the server, all updated certificates provided to the client by the private certificate authority of the sole and only root certificate authority; and
maintaining, by the server, a second updated hash value for the endpoint as a staged hash value for a new certificate of the endpoint that is inactive, has not been released, has not been required by the endpoint for use at the time of the update request from the client allowing the server to update the client with the new certificate when the new certificate is activated without having to obtain the new certificate.

2. A method, comprising:

requesting, by a client, an updated hash value from an update server, the updated hash value associated with an endpoint certificate and the client performs the requesting of the updated hash value when a first computed hash value does not match an expected hash value for the endpoint certificate, wherein the update server is an only and sole root certificate authority from which all updated hash values are obtained for all endpoints wherein requesting further includes authenticating with the update server and establishing a secure and custom-encrypted communication session with the update server, wherein authenticating further includes receiving a second certificate from the update server that is signed by a private certificate authority of the sole root certificate authority for authenticating during the secure and custom-encrypted communication session;

receiving, on the client, a list from the update sever, wherein the list comprises the updated hash value and additional updated hash values for all permissible endpoint certificates and the client receives the list based on the requesting of the updated hash value;

verifying, on the client, that a second computed hash value from the endpoint certificate matches the updated hash value;

permitting, on the client, a connection to an endpoint when the second computed hash value matches the updated hash value and when an update server certificate associated with the updated hash value is signed by the private certificate authority of the sole root certificate authority; and obtaining, on the client, a new certificate of the endpoint when activated for the endpoint from the update server that the update server held in advance of the activation and provided when the activation occurred.

3. The method of claim 2, wherein requesting further includes obtaining the expected hash value from secure memory.

4. The method of claim 2, wherein obtaining further includes caching the list in secure memory with an indication that each hash value in the list has no expiration date.

5. The method of claim 2 further comprising, determining a type associated with the endpoint when the updated hash value does not match the second computed hash value.

6. The method of claim 5, wherein determining further includes terminating any connection to the endpoint when the type is determined to be a primary endpoint.

7. The method of claim 5, wherein determining further includes permitting an unverified connection to the endpoint to proceed when the type is determined to be a secondary endpoint for a verified primary endpoint connection.

8. The method of claim 7 further comprising, presenting a warning message to a user indicating that the endpoint is unverified and requesting, through a user interface, that the user confirm that the user wants to proceed with the unverified connection.

9. The method of claim 5 further comprising, logging an indication when the updated hash value for the endpoint does not match the second computed hash value with a remote log server.

10. A system, comprising:

a server comprising a sever processor and a server non-transitory computer-readable storage medium having executable instructions representing a security update manager; and a device comprising a device processor and a device non-transitory computer-readable storage medium having executable instructions representing a security agent;

wherein the security agent when executed by the device processor from the device non-transitory computer-readable storage medium is configured to cause the device processor to:

connect to the server when a hash value for an endpoint certificate does not match a computed first hash value;

obtain a list from the server, wherein the list comprises an updated hash value for the endpoint certificate and additional updated hash values for all permissible endpoint certificates of the device;

obtain an updated endpoint certificate associated with the updated hash value;

verify that the updated hash value matches a computed second hash value for the endpoint certificate; and verify a signature of the updated endpoint certificate matches a private signature of a private certificate authority for the server; and wherein the security update manager when executed by the server processor from the server non-transitory computer-readable storage medium is configured to cause the server processor to:

establish a secure and custom encrypted session with the security agent for providing the list comprising the updated hash value with the updated endpoint certificate having the private signature of the private certificate authority by authenticating the device and establishing the secure and custom-encrypted communication session with the device and providing a second certificate to the device that is signed by the private certificate authority of a sole root certificate authority of the device for the device to authenticate for the secure and custom-encrypted communication session;

service the device as an only and a sole root certificate authority from which all hash values for all endpoints are obtained; and maintain a second updated hash value for a specific endpoint as a staged hash value for a new certificate of the specific endpoint that is inactive, has not been released, has not been required by the specific endpoint for use at the time of an update request from the device allowing the server to update the device with the new certificate when the new certificate is activated without having to obtain the new certificate.

11. The system of claim 10, wherein the server is part of a cloud processing environment having at least one additional server.

12. The system of claim 10, wherein the device is one of: a wearable processing device, a tablet, a phone, a desktop computer, an appliance that is part of the Internet-of-Things (IoTs), and a computer-enabled device integrated into a transportation vehicle.

* * * * *